May 2, 1939.  R. J. EMMONS  2,156,280
WEIGHT CONTROLLED FILLING MACHINE
Filed Nov. 22, 1935   5 Sheets-Sheet 1

INVENTOR
RUSSELL J. EMMONS
BY
ATTORNEY

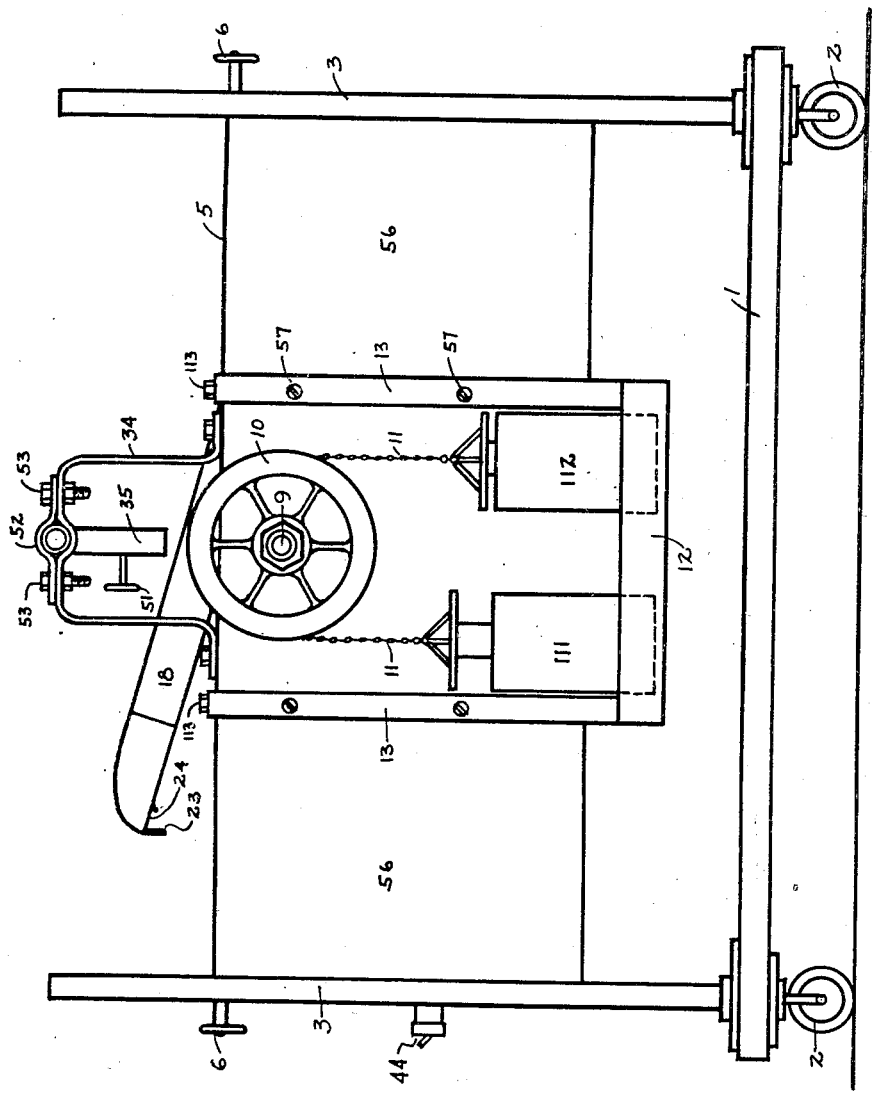

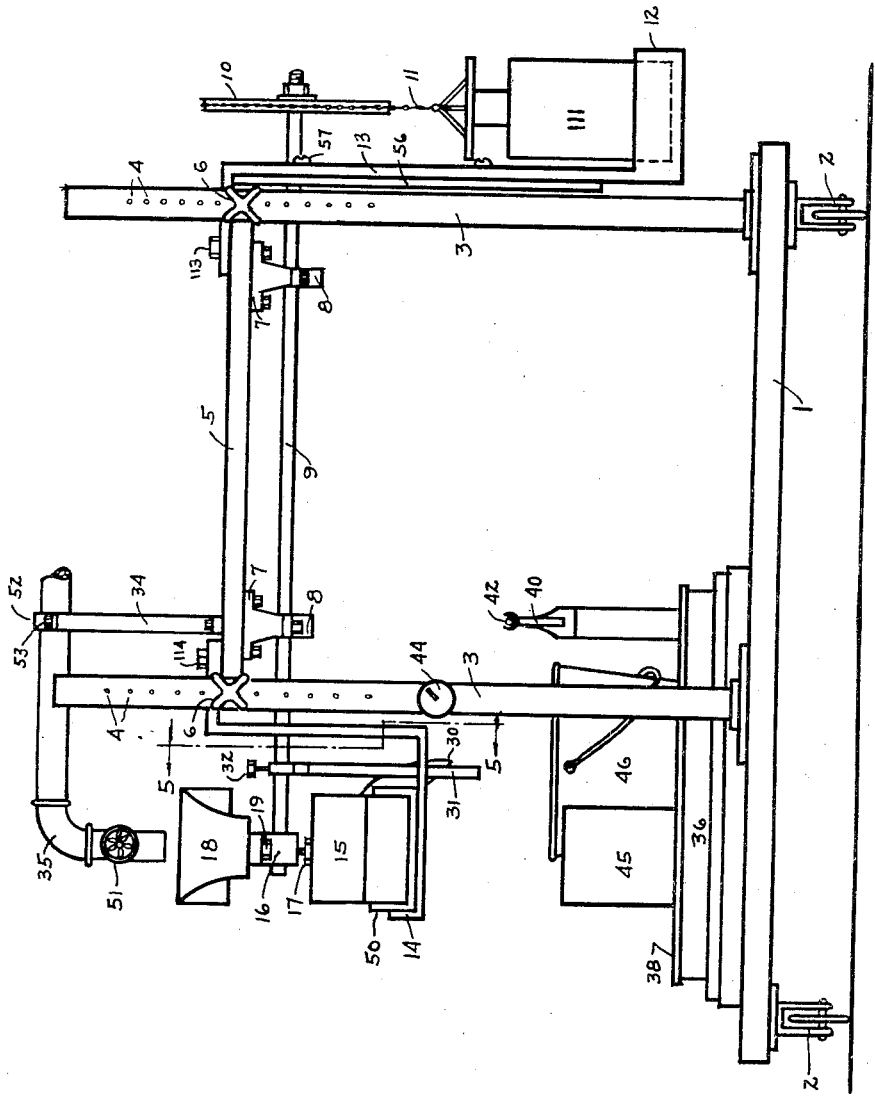

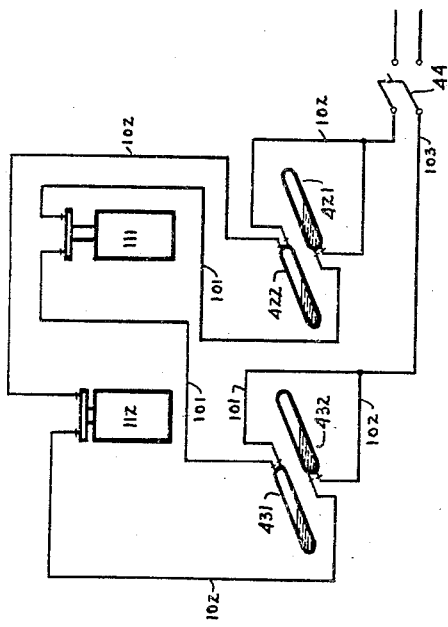
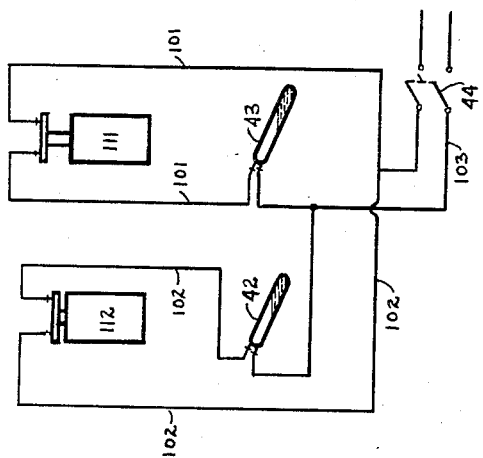

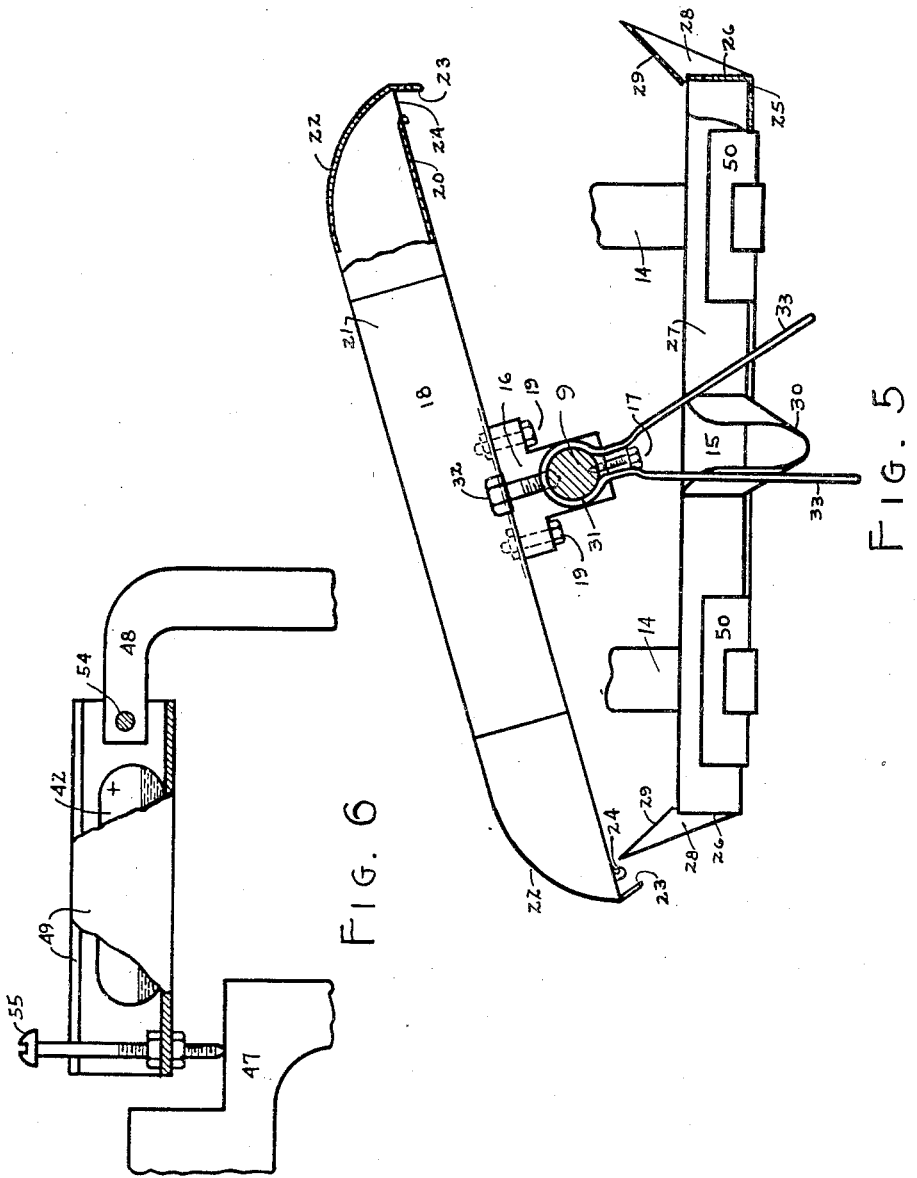

Patented May 2, 1939

2,156,280

UNITED STATES PATENT OFFICE 2,156,280

WEIGHT CONTROLLED FILLING MACHINE

Russell J. Emmons, Cleveland, Ohio, assignor to The Glidden Company, Cleveland, Ohio, a corporation of Ohio Application November 22, 1935, Serial No. 51,127

8 Claims. (Cl. 249—27)

This invention relates to filling machines, and has particular reference to a new and novel machine of this type, characterized by its low initial cost, low upkeep cost, assurance of accurate filling, simplicity and ease of cleaning. More particularly, it refers to a machine for filling paint and other liquids comprising a pair of scales, a tilting delivery trough adapted to pour the material to be filled into a can on one of the scales, means, controlled by the motion of the scale beams, which tilt the trough so that it pours into a can on the second scale, and a drip pan arranged under the tilting trough to assure a clean cut-off on the break.

A great many devices have been used and suggested for the filling of liquid into containers, where a uniform fill of any given material is desired. These machines are necessary because the human eye and hand are neither quick enough nor accurate enough to insure uniform filling in the single operation which is essential if any speed in filling is to be attained. Where the eye is used to judge volume, the containers are always filled with varying amounts of material; while where the material is weighed on a scale, the work is slow, and overweight containers are the rule unless the operator takes the time necessary to remove over-fills.

A great many devices which deliver exact volumes or exact weights of material are in use at the present time. These devices are generally complicated machines, which require some time to set up for a run, and which are somewhat difficult to clean afterwards. They are usually successful where one material only is being filled, or where a very large run is being made. These machines are, however, not adaptable to frequent changes in material or quantity.

In the paint industry in particular, the problem of filling has proved difficult. A great many different batches of different colors and ingredients are made and filled out regularly; and dirty equipment cannot be used, as the old material clings to the equipment in such a manner that it is not washed out with the first of the new, but blends with it interminably. Further, there are very few runs of very large batches of filling, where the same material is filled into the same sized cans. The filling machines which deliver exact fills can, therefore, be used only in exceptional cases, e. g., for the filling of small cans in large lots.

Because of the large number of relatively small filling jobs, representing the bulk of a paint plant's production, there has been a demand for a filling machine which would serve such a purpose. Essential characteristics of such a machine are ready convertibility from one material to another, ready convertibility from one size to another, ease of cleaning, and, of course, accuracy in filling. An additional requirement is absence of sparking due to electrical or mechanical causes; this is important because of the fire hazards presented by any paint plant.

Heretofore there has been no filling machine submitted to the paint industry which would meet the requirements; and as a result, the use of filling machines has been restricted to the filling of large numbers of small cans, while the bulk of the filling has been done manually, either estimating volume by eye, or actually weighing each can.

I have developed a new and novel filling machine which fits the needs of the paint industry, and permits of the economical replacement of old hand filling methods. This machine is characterized by its simplicity and absence of complicated mechanical movement and by the complete inclosure of all electrical connections, whereby the fire hazard is practically eliminated. It is further characterized by the ease with which it is set up, and by the ease with which a change of size or material may be made. It is still further characterized by the ease with which it may be cleaned, and by the fact that the only parts which come into contact with the material filled, may be easily replaced by duplicate parts so that filling may be continued while cleaning. With all these advantages, it offers absolutely accurate filling in a semi-automatic style. The last principal advantage is its low cost, both initially and in operation.

The machine comprises two scales, on which containers are set, with mercury switches on their beams which control the action of a tilting delivery trough. The switches are set so that when a container is filled from the trough, and the beam tilts, a contact is made which reverses the trough, which then feeds into the other container. The operator need only replace the full container by an empty after each reversal to assure continuous operation. The delivery trough, and a cut-off drip pan in connection therewith, are the only parts of the machine which come into contact with the material filled; they may be removed from the machine, and cleaned, while duplicate parts may be attached to assure continuous operation if desired.

The construction and operation of the machine may perhaps be best understood by referring to the accompanying drawings, in which Figure 1 is a front elevation of the machine, in one filling position;

Figure 2 is a rear elevation, in the same position;

Figure 3 is a side elevation, in neutral position;

Figure 4 is a wiring diagram, showing the operative connection between the switches and the solenoids;

Figure 5 is a detail of the delivery trough and the drip pan, taken along the line 5—5 in Figure 3, but in filling position;

Figure 6 is a detail showing the method of adjustably mounting the mercury switches on the scale beams; and Figure 7 is a wiring diagram of an alternative form of my invention.

Figure 1:
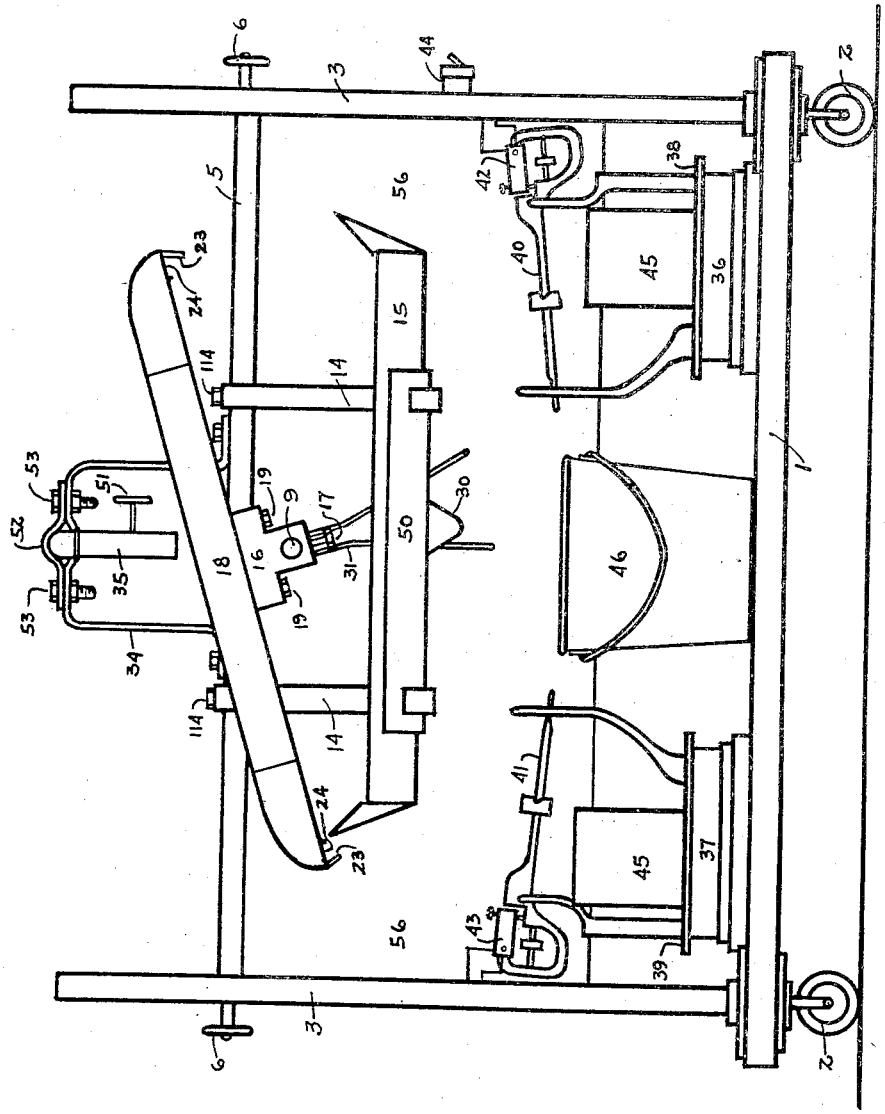

Referring to the drawings, the preferred embodiment of my invention is mounted on a lower platform 1, carrying casters 2, which permit the entire mechanism to be moved from place to place. Posts 3 are mounted close to the corners of the platform; these posts are provided with series of openings 4. A second platform 5 is adjustably connected to the posts 3, by means of pins 6 which pass through the openings 4 and into openings in the platform. Platform 5 may be adjusted relative to platform 1 by placing a jack between the two platforms, removing the pins, moving the jack up or down, and reinserting the pins.

Mounted on the bottom side of the platform 5 are brackets 7 which carry bearings 8 supporting a horizontal rocker shaft 9. At the rear of this shaft, it is keyed to a gear wheel 10, adapted to be driven by a chain 11 arranged thereover. The ends of the chain 11 are connected to the tops of solenoids 111 and 112. These solenoids are supported on a platform 12 connected to the platform 5, by brackets 13 which are bolted to the platform, so that they may be removed if desired by bolts 113.

At the front end of the device, a second set of brackets 14 is connected to the platform 5 by means of bolts 114. The front brackets support a tray slide 50, on which is mounted a drip pan 15, whose function will be described later.

Referring now particularly to Figure 5, at the front end of the shaft 9, a collar 16 is keyed thereto by means of a set-screw 17, so that the collar is removable by slipping it over the front end of the shaft. A delivery trough 18 is bolted to the shaft collar by bolts 19, so that it can be removed from the shaft collar if desired. The trough comprises a flat bottom member 20, connected throughout its length with side members 21. Close to the ends of the side members 21 are provided curved top plates 22, which curve downwardly and outwardly to the plane of the bottom member, and have lip portions 23 below the plane of the bottom member directed inwardly. The bottom member is cut short of the ends of the side member, leaving openings 24 through which the liquid will pass. This construction is designed to prevent splashing, and particularly to insure a rapid cut-off when the device shifts from one filling position to the other.

As stated above, the brackets 14 support a tray slide 50, and a drip pan 15 comprising a bottom plate 25, end plates 26 and side plates 27. Connected to the ends of the drip pan, and preferably integral therewith, are drip cut-offs, comprising preferably on each end a sheet of metal 28 at an angle to the bottom member 25, supporting a second sheet of metal 29 which is bent inwardly and downwardly, and whose lower end overlaps the end member 26, whereby any liquid caught by it will run into the pan 15. In the middle of the rear side member 27 is a drip spout 30 from which the liquid in the drip pan flows.

The drip pan is operatively connected to the shaft 9 by a yoke 31, keyed to the shaft by a bolt 32. Rocker arms 33 extend downwardly from the yoke, and engage the drip spout 30 on either side, so that a rocking of the shaft will move the drip pan horizontally on the slide 50.

On the front end of the platform 5 a pipe support 34 is provided, onto which a liquid delivery pipe 35 may be bolted or rested. This pipe is provided with a hand valve 51, and the pipe support is so arranged that its delivery opening is positioned above the central portion of the delivery trough. The pipe may be bolted in place on the support by means of a clamping collar 52, attachable to the support 34 by bolts 53. This pipe forms no part of the mechanism of my machine, and any source of liquid delivering to the delivery trough is acceptable.

Supported on the platform 1 are beam scales 36 and 37 of conventional design, provided with platforms 38 and 39 and beams 40 and 41. Mounted on the beams are mercury switches 42 and 43, which are connected so as to make and break circuits which operate the solenoids.

Referring now to Figure 4, the wiring diagram, the mercury switches, 42 and 43, are connected in series by means of circuits 102 and 101, to the solenoids 112 and 111, respectively, the two circuits being connected in parallel across a power circuit 103, which is connected to the machine through a switch 44. When both scale beams are down, neither of the solenoids is actuated; as they exert no pull, and the core is already down in one or the other, there is no change. Thus, if the solenoid 112 is down, the left end of the machine is tilted for delivery. As soon as the left scale beam is tilted upward as a result of the filling of a can, the circuit controlling the solenoid 111 is made through the switch 43; the solenoid 111 is pulled downward, and the delivery trough is tilted to deliver onto the scale 36.

In the operation of the machine, the cans 45 to be filled are placed on the scales, which are set for the desired weight. A drip bucket 46 is set under the drip spout 30 to catch the overflow. The delivery trough 18 is tilted in one direction; the drip pan 15 is pushed over in the opposite direction by the action of the rocker arms 33. Liquid is flowed through the trough, and is directed inwardly and downwardly through an opening 24 by the lip 23, into the can. As soon as the desired weight is reached, the balance arm starts upward; the mercury in the switch shifts and makes the contact; and the other solenoid acts to rotate the shaft 9. This tilts the delivery trough so as to start the flow in to the opposite can; the full can can be removed, and an empty can substituted, ready for the next reversal.

The design of my delivery trough and drip pan are especially desirable, as a clean cut-off is obtained. When the trough is swung upward by the action of the solenoids, the pan is pushed in the direction of the upswinging end by the action of the rocker arm. The stream of liquid is met by the cut-off sheet 29, just as the delivery trough 18 is horizontal; the residual drip thereupon flows over the sheet 29 into the drip pan.

For the convenience of the operator in reading the scales, I prefer to hide the back mechanism from view by means of a back-board 56, which may be attached to the solenoid platform brackets 13 by means of screws 57. This backing is not at all necessary, but I have found it desirable as tending to keep the operator's attention on the work, and in preventing slight confusion in reading the scale.

In order to permit of adjusting of the mercury switches, so that the reversal of flow can be made at any point in the upward swing of the beam, I do not attach the switches rigidly to the beams. As shown in Figure 6, I place the switches inside of metal tubes 49. A pin 54 is passed through the tube, and a horizontally extending extension 48 of the end of the scale beam, thereby pivoting the tube onto the end of the beam. Another portion of the beam is cut away to provide a shelf 47, which supports a set screw 55 passing through the inner end of the tube 49. In this manner, by adjusting the set screw, the level of the mercury switch can be changed, so that adjustment can be made for time of reversal, and irregularities in the floor supporting the machine.

In order to prevent reversal of flow, or pulling of the solenoids against each other, upon accidental raising of one beam scale while the other scale has a full can thereon, I may replace the circuit shown in Figure 4 by that shown in Figure 7, where two mercury switches are mounted on each beam. In this form of the device, circuit 101 comprises solenoid 111, and switches 421 and 431, mounted on separate beams; circuit 102 comprises solenoid 112 and switches 422 and 432. The switches in each circuit are connected at opposite ends, so that when both beams are down, or up, no solenoid is energized. A circuit can be completed only when one beam is up and the other down. This occurs only when a can is filled, and the action is arranged to reverse the delivery trough at this point. When the can is removed, the beam falls, and the circuit is broken, thus cutting off all flow through the machine; friction and liquid flow maintain the trough in operative position, until the other beam swings upward. By this construction, I can eliminate the flow of a current except for the period between the reversal of flow, and the removal of the full can.

I claim:

1. A filling machine comprising a pair of scales, a tilting delivery trough mounted above said scales to deliver material to the scales alternately, means operable by the scales to reverse the delivery trough, and drip means operatively connected with the delivery trough to slide under the upswinging end of said trough.

2. A filling machine comprising a pair of scales, a tilting delivery trough mounted above said scales and adapted to deliver material to the scales alternately, said trough being mounted on a rocker shaft, solenoids operatively connected to said rocker shaft, and electrical means operable by the scales to make circuits through the solenoids, whereby they actuate the rocker shaft and tilt the delivery trough, and drip means operatively connected with the delivery trough, so as to slide under the upswinging end of said trough.

3. A filling machine comprising a pair of scales, a tilting delivery trough mounted above said scales and adapted to deliver material to the scales alternately, said trough being mounted on a rocker shaft, solenoids operatively connected to said rocker shaft, and mercury switches mounted on the scale beams so as to make circuits through the solenoids when a beam is tilted upward, whereby they actuate the rocker shaft and tilt the delivery trough, and drip means operatively connected with the delivery trough, so as to slide under the upswinging end of said trough.

4. A filling machine comprising a rocker shaft, a pair of solenoids connected to the rocker shaft and adapted to revolve said shaft alternately, a tilting delivery trough mounted on said shaft, a drip operatively connected with said shaft to slide under the upswinging end of said trough, scales beneath the delivery ends of said trough, and a pair of mercury switches so mounted on each of said scales as to make a circuit through the opposite solenoid only when the scale beam tilts upward, while the other scale beam remains downward.

5. A filling machine comprising a rocker shaft, a gear wheel carried by said shaft, a chain mounted over said gear wheel, and connected at its ends to the cores of solenoids, a two-way delivery trough carried by said shaft mounted with its delivery openings above two scales, a drip pan operatively connected to said shaft, by a yoke and rocker arms, and electrical connections operable by the upward swing of the beams of said scales to induce circuits through the opposite solenoids, whereby the delivery trough is tilted to deliver onto the scale corresponding to the activated solenoid, and simultaneously the drip pan is moved under the upswinging end of the delivery trough to catch the drip therefrom.

6. In a filling machine, a delivery trough comprising a bottom member, side members joining said bottom member throughout its length and extending beyond the ends of said bottom member, top end members joining the side members at the end thereof, and closing off the end and part of the top of the trough, and lips extending inwardly and downwardly from the end member toward the bottom member below the plane of said bottom member.

7. A filling machine comprising a pair of scales, a tilting delivery trough mounted above said scales to deliver material to the scales alternately, means operable by the scales, to reverse the delivery trough, and drip means operatively connected to the delivery trough to slide under the upswing end of said trough, said trough comprising a bottom member, side members joining said bottom member throughout its length and extending beyond the ends of said bottom member, top end members joining the side members at the end thereof, and closing of the end and part of the top of the trough, and lips extending inwardly and downwardly from the end member toward the bottom member below the plane of the bottom member, whereby paint thrown off by the upswinging end of the trough is directed into the drip means.

8. A filling machine comprising a pair of beam scales, a tilting delivery trough mounted above said scales to deliver material to the scales alternately, electrical means separately operable by each of said scales when one scale beam is down and the other up for tilting said trough to prevent flow of material onto the scales, the beam of which is not in downward position, and drip means operable simultaneously with the tilting of the delivery trough to slide under the upwardly swinging end of the delivery trough.

RUSSELL J. EMMONS.